Feb. 21, 1939.   H. R. SEGAL   2,147,930
VANITY CASE
Filed April 29, 1936
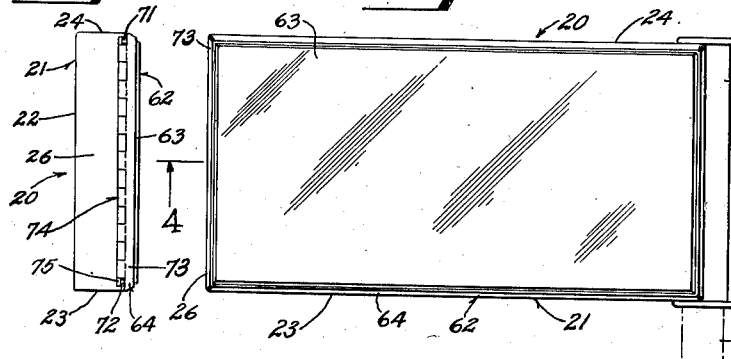
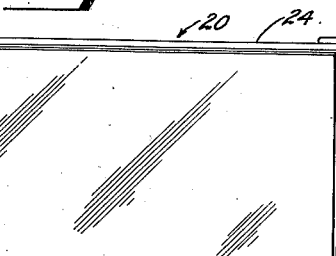
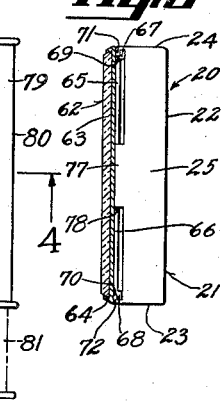
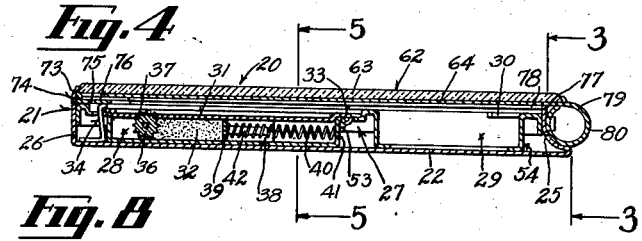
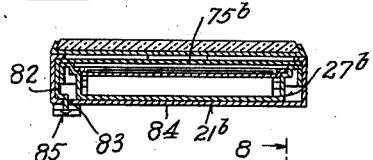
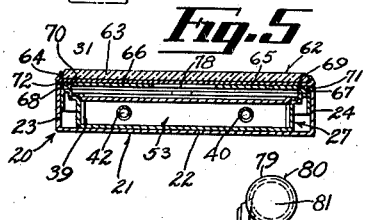
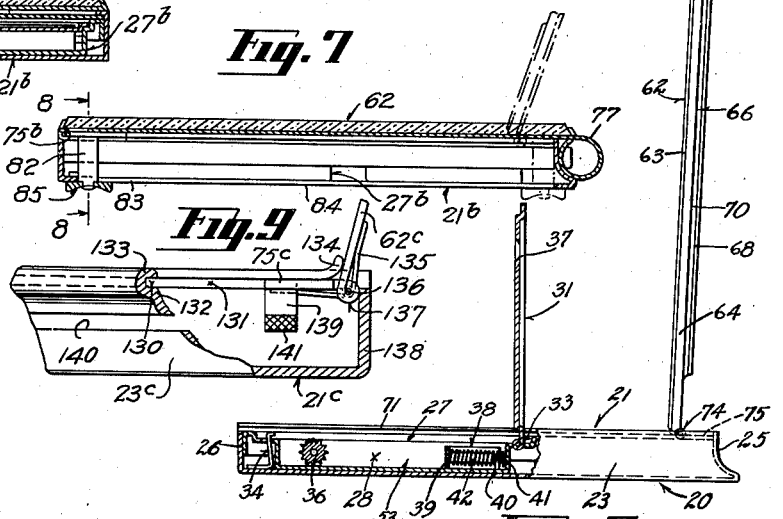
INVENTOR
HYMAN R. SEGAL
BY
William F. Feyrer
ATTORNEY Patented Feb. 21, 1939

2,147,930

UNITED STATES PATENT OFFICE 2,147,930

VANITY CASE

Hyman R. Segal, New York, N. Y.

Application April 29, 1936, Serial No. 76,921

16 Claims. (Cl. 132—83)

This invention relates to new and useful improvements in vanity cases.

An important object of the invention is to provide a vanity case which is sturdy in construction and which may be easily manipulated.

A further object of the invention is to provide a vanity case in which the mirror is advantageously positioned relative to the cosmetic retaining part when the case is in use.

Yet another object of the invention is to provide a vanity case having a pivoted cover in which the necessity for the usual snap connection between cover and case is eliminated.

In achieving these objects and others to be hereinafter set forth there is provided as a meritorious feature of the invention a structure in which the mirror is slidable to an extended position relative to the case, to uncover a cosmetic retaining compartment, the mirror being maintained in a lowered position relative to the case while it is moved to the extended position, and through a particularly unique arrangement of parts is enabled to be swung upwardly to a raised position relative to the case after the cosmetic retaining compartment has been uncovered.

A further feature of the invention resides in the provision in a vanity case having a mirror which is slidable to uncover a cosmetic retaining compartment and which is associated with the case in such a way that it may be swung upwardly to a raised position after the cosmetic retaining compartment has been uncovered, of an end wall having an upwardly extending portion which is cooperable with means on the underside of the mirror for limiting the sliding movement of the mirror after the cosmetic compartment has been uncovered.

Still another feature of the invention is the provision in a vanity case having a mirror constituting a cover therefore which is adapted to slide relative thereto to uncover a cosmetic retaining compartment and which through a pivotal connection is adapted to be thereafter swung upwardly to a raised position relative to the case, of a tubular member adapted to hold a lip stick, or the like, the tubular member extending downwardly from the mirror to overlap the outer face of an end wall thereof and serving as a stop for limiting sliding movement of the mirror in one direction and serving also as a handle to facilitate movement of the mirror.

Yet another feature of the invention includes the provision of a vanity case having a slot in the outer casing through which an operating button or pin projects for movement relative to the casing of a movable element supported by the casing.

Other and more specific features residing in advantageous forms, combinations and relation of parts will hereinafter appear.

In the drawing:

Fig. 1 is a top plan view of the preferred form of the present invention.

Fig. 2 is an end view of the vanity case shown in Fig. 1.

Fig. 3 is a view partly in section taken on the line 3—3 of Fig. 4.

Fig. 4 is a sectional view taken on the line 4—4 of Fig. 1.

Fig. 5 is a sectional view taken on the line 5—5 of Fig. 4.

Fig. 6 is a view, partly in section, of the vanity case shown in Fig. 1 showing certain of the parts in a raised or open position.

Fig. 7 is a side view showing a slightly modified form of the invention, one of the side walls of the main case being removed.

Fig. 8 is a sectional view taken on the line 8—8 of the modification shown in Fig. 7.

Fig. 9 is a fragmentary view partly in section of a modification of the invention shown in Figs. 1 thru 6.

Referring to the drawing, and first to Figs. 1 thru 6, there is illustrated a vanity case 20 comprising a main case 21 having a bottom 22, side walls 23 and 24, a forward end wall 25 and a rear end wall 26. Secured within the main case in any suitable manner is a receptacle 27 having cup shaped sections 53 and 54 constituting compartments 28 and 29 for the reception of cosmetics. The receptacle may be made up of a plurality of parts but preferably, and as shown, it is made as an integral unit.

As shown, the compartment 29 is adapted to receive a pan of rouge or the like. A tongue 30, which may be advantageously formed integral with the receptacle, extends over the compartment to hold the rouge (not shown) in place.

The compartment 28 is provided with a cover plate 31, constituting a partition for retaining loose powder 32 within the compartment. Preferably the cover plate is pivotally connected to the receptacle by means of a hinge 33 and normally retained in a closed position by a snap connection 34.

Supported in the compartment 28 on pivots 35 is a roller conveyer 36 projecting into a powder outlet aperture 37 which, as shown, may be conveniently formed in the cover plate 31. Rotation of the roller conveyer, as by wiping a powder puff across the portions projecting into the powder outlet aperture, causes a measured amount of powder to be fed from the compartment through the aperture. When the vanity case is not in use the roller conveyer effectively closes the aperture to prevent the loose powder finding its way out of the compartment.

In order to insure a proper functioning of the powder dispensing unit, there is provided a means 38 in the compartment for maintaining the loose powder in contact with the roller conveyer. This means comprises a follower or pusher plate 39 spaced from and having a normal bias to move in the direction of the roller conveyer. An advantageous manner of achieving this bias is illustrated in Figs. 4 and 6 as comprising the provision of springs 40 interposed between a side wall 41 of the compartment and the pusher plate to urge the latter in the direction of the roller. Pins 42 secured to the pusher plate and extending therefrom into the central portions of the springs maintain the latter in proper relation with the pusher plate.

With this construction there is provided an especially advantageous powder dispensing unit in that even though the supply of powder in the compartment be appreciably reduced, it is maintained in contact with the conveyer roller, thus ensuring a proper functioning of the unit at all times.

Constituting a cover for the main case is a mirror 62 which is movable to an extended position relative to the case and which in the extended position is adapted to be swung upwardly to a raised position as best illustrated in Fig. 6. The means used in accomplishing this result forms one of the important features of the invention and will be described in detail.

The mirror 62, which constitutes the cover for the case, is shown as composed of a glass 63 carried in a frame 64 but it is within the scope of the present invention to omit the frame, especially if the mirror be made entirely of metal. Secured to the underside of the frame are a pair of runner plates 65 and 66 having offset portions 67 and 68 spaced downwardly from the underside of the mirror frame to define therewith guide grooves 69 and 70. These runner plates are positioned adjacent to the side edges respectively of the mirror frame and when the mirror is in normal or closed position extend longitudinally of the case from adjacent the inner face of the forward end wall 25 to a point spaced inwardly from the inner face of the rear end wall 26 thereof.

Extending into these grooves 69 and 70 and cooperating with the flanges or offset portions 67 and 68 and with the underside of the mirror frame to normally maintain the mirror in sliding association with the main case and in a lowered position relative thereto are flanges 71 and 72. Preferably, and as shown, these flanges are formed by bending over the upper portion of each of the side walls 23 and 24 of the main case. Serving as a supplemental support for the mirror is the receptacle 27 which, as can be seen in Fig. 5, has portions underlying the offset portions of the runner plates 65 and 66.

Pivotally connected to the mirror frame adjacent the rear edge 73 thereof by a hinge 74 is a hinge plate 75 which extends from one side of the case to the other. This plate is supported by the receptacle 27 and maintained in association with the case by the flanges 71 and 72 which overlie portions of the upper face 76 of the hinge plate 75 adjacent the side edges thereof.

When the vanity case is not in use, the mirror is positioned to effectively close the main case, and is held in a lowered position by the flanges 71 and 72 in the manner described above. This position of the mirror is shown in Fig. 4. When it is desired to use the vanity case the mirror is moved to an extended position to project outwardly from the front end wall 25 of the case. In this position the offset portions 67 and 68 of runner plates 65 and 66, which terminate at a point spaced inwardly from rear edge of the mirror frame, no longer underlie the flanges 71 and 72. This permits the mirror to be swung upwardly on the hinge 74 to a raised position as shown in Fig. 6, the mirror being maintained in association with the main case 21 by the hinge plate 75, which, as previously explained, is restrained from any movement other than sliding movement relative to the main case by the flanges 71 and 72 and by the receptacle 27.

A vanity case having a mirror associated therewith in the above described manner possesses certain real advantages over the types of cases heretofore devised. In a vanity case constructed in accordance with the teachings of the present invention there is eliminated the necessity for the often ineffective snap connection used in the usual pivoted cover vanity case to maintain the cover in a closed position and this is accomplished without sacrificing one of the definite advantages of the pivoted cover type case over the usual sliding cover type. This advantage lies in the fact that the user may, because the mirror is at an angle to the cosmetic retaining compartment when case is in use, observe the application of the cosmetics without closing the case and without the danger of the powder and other contents dropping out as would be the case if it were necessary to tilt the cosmetic compartment in order to place the mirror in a semi-upright position.

As a means for limiting movement of the mirror outwardly beyond the extended position, the forward end wall 25 may be advantageously provided with an upwardly extending portion or stop 77. Preferably, and as shown, this stop is formed integral with the forward end wall 25 and is centrally positioned to extend into a channel 78 defined by the runner plates 65 and 66 which, as clearly illustrated in Fig. 5, are spaced from each other transverse the mirror frame. Upon movement of the mirror to an extended position, the hinge plate 75, which extends from one side of the case to the other, engages the stop 77 to prevent movement of the mirror outwardly beyond that position. This feature is of importance in that it prevents an inadvertent separation of the mirror from the case with the consequent danger of falling and breaking or of loss.

As a further feature of the invention, there is provided a portion 79 which extends downwardly from the mirror to overlap the outer face of the forward end wall 25 when the mirror is in a closed position. This downwardly extending portion 79 constitutes a stop for limiting longitudinal movement of the mirror when in the latter position. Thus, after the vanity case has been opened and used, and the mirror is swung downwardly and then slid inwardly to a closed position, further movement thereof is arrested by the cooperation of the downwardly extending portion 79 and the outer face of the forward end wall 25. This feature is of significance in that it serves to align the mirror with the case and to aid in preventing a separation of the mirror and the case when the mirror is in a closed position. Preferably, and as shown, the downwardly extending portion is tubular and is formed integral with the mirror frame. This downwardly extending tubular portion not only is adapted to hold a lip stick 81 or the like but provides a handle 80 by means of which the mirror may be moved to its various positions.

The modification of the invention illustrated in Figs. 7 and 8 embodies all of the elements contained in the preferred form of the invention shown in Figs. 1 thru 6 and in addition provides a special means for sliding the mirror relative to the main case. This means comprises a mirror moving member 82 connected to the mirror and extending downwardly therefrom to pass thru a slot 83 formed in the bottom 84 of the main case 21b. Preferably, and as shown clearly in Fig. 8, this mirror moving member is formed integral with the hinge plate 75b and extends downwardly between a side wall of the main case and the receptacle 27b. To facilitate a movement of the mirror moving member a button 85 may advantageously be secured to the portion of the mirror moving member which extends thru the slot. The operation of the modified structure differs from that of the preferred embodiment of the invention mainly in that the mirror is moved from a closed position to an extended position and from an extended position to a closed position by movement of the mirror moving member 82 rather than by direct contact with the mirror. After the mirror has been moved into extended position it is swung upwardly in precisely the same manner as in the case of the preferred embodiment as described hereinbefore.

Fig. 9 shows a further modified form of the present invention, similar to the forms disclosed in Figs. 1 thru 6 inclusive and Figs. 7 and 8 differing mainly in the provision of a hinge plate 75c which is co-extensive with a mirror 62c and slidable in channels 130 and 131 formed on opposite sides of the main case by integral bottom and top flanges 132 and 133, the latter having curved ends 134 adapted to allow the mirror 62c to be swung into the upper or raised position shown under the influence of a spring 135 which is on the pin 136 of the pintle hinge 137 between the hinge plate and the mirror. Thus, as the mirror is moved to the outer station and just prior to the hinge 137 engaging the end wall 138 of the case 21c the spring swings the mirror upwardly into the raised position. The curved flange 134, as it is spaced relative to the end wall, limits the extent to which the mirror may be so swung upwardly. Preferably a slight space is provided between the inner compartment and the side wall 23c and the hinge plate 75c is provided with an integral tongue 139 extended downwardly a short extent and then outwardly thru a slot 140 in the side wall 23c in order to provide a push button 141 whereby the mirror may be moved to both the closed position on the case and to the raised position shown by merely pushing the button along the side wall. The hinge engaging the end wall also limits movement of the mirror into the raised position.

Variations and modifications may be made within the scope of the present invention and portions of the improvements may be used without others.

Having thus described the invention, what is claimed as new is:

1. In a device of the character described, the combination of a main case; a mirror cover slidably and pivotally associated with said main case, movable longitudinally thereof to an extended position projecting outwardly therefrom; and guide means for maintaining said mirror cover in a lowered position relative to said case until moved to said extended position and for then releasing the same to be swung to a raised position relative to the case.

2. In a device of the character described, the combination of a main case; a mirror cover slidably and pivotally associated with said main case, movable longitudinally thereof to an extended position projecting outwardly therefrom; means for preventing movement of said mirror outwardly beyond said extended position; and guide means for maintaining said mirror cover in a lowered position relative to said case until moved to said extended position and for then releasing the same to be swung to a raised position relative to the case.

3. In a device of the character described, the combination of a main case having two side walls and an end wall; a mirror constituting the cover for said case and adapted to be moved longitudinally thereof to an extended position relative thereto; means for supporting said mirror relative to said case; a flange spaced upwardly from said supporting means extending inwardly from each of said side walls; means carried by said mirror, cooperable with said flanges for maintaining said mirror in a lowered position relative to said case until it has been moved to said extended position and for then releasing the same; and means carried by said mirror, cooperable with said flanges and said supporting means for maintaining said mirror in association with said case after it has been moved to said extended position, said last named means having a hinge connection with said mirror whereby the latter may be swung to a raised position relative to said case.

4. In a device of the character described, the combination of a main case having two side walls and an end wall; a centrally positioned stop on said end wall; a mirror cover slidably associated with said case and adapted to be moved longitudinally thereof to an extended position relative thereto to project outwardly with respect to said end walls; guide means on said side walls for maintaining said mirror cover in a lowered position relative to said case during movement thereof to said extended position; and means on said mirror cooperable with said stop for limiting movement of said mirror outwardly beyond said extended position.

5. In a device of the character described, the combination of a main case having two side walls and an end wall; a centrally positioned stop on said end wall; a mirror cover slidably associated with said case and adapted to be moved longitudinally thereof to an extended position relative thereto to project outwardly with respect to said end wall; guide means for maintaining said mirror cover in a lowered position relative to said case during movement thereof to said extended position and for then releasing the same; means on said mirror cover cooperable with said stop for limiting movement of said mirror outwardly beyond said extended position; means for maintaining said mirror in association with said case after it has been moved to said extended position; and pivot means between said mirror cover and said last named means whereby said mirror cover may be moved to a raised position relative to said case.

6. In a device of the character described, the combination of a main case having two side walls and an end wall; an inner and outer face on said end wall; a centrally positioned stop on said end wall; a mirror cover slidably associated with said case and adapted to be moved longitudinally thereof from a closed to an extended position relative thereto to project outwardly with respect to said end wall; a portion extending downwardly from said mirror cover to overlap the outer face of said end wall when the mirror cover is in closed position for limiting longitudinal movement of said mirror cover; guide means for maintaining said mirror cover in a lowered position relative to said case until movement thereof to said extended position and for then releasing the same; means on said mirror cooperable with said stop for limiting movement of said mirror outwardly beyond said extended position; means for maintaining said mirror cover in association with said case after it has been moved to said extended position; and pivot means between said mirror cover and said last named means whereby said mirror cover may be moved from a lowered position to a raised position relative to said case.

7. In a device of the character described, the combination of a main case having two side walls and an end wall; an inner and outer face on said end wall; a stop on said end wall; a mirror cover slidably associated with said case and adapted to be moved longitudinally thereof from a closed to an extended position relative thereto to project outwardly with respect to said end wall; a substantially tubular portion adapted to hold a lip stick, or the like, and extending downwardly from said mirror cover to overlap the outer face of said end wall when the mirror cover is in closed position and adapted to limit longitudinal movement of said mirror; guide means for maintaining said mirror cover in a lowered position relative to said case until movement thereof to said extended position and for then releasing the same; means on said mirror cover cooperable with said stop for limiting movement thereof outwardly beyond said extended position; means for maintaining said mirror cover in association with said case after it has been moved to said extended position; and pivot means between said mirror cover and said last named means whereby said mirror cover may be moved from a lowered position to a raised position relative to said case.

8. In a device of the character described, the combination of a main case; a slidable mirror cover; means for slidably supporting the mirror cover in the case; and a lip stick compartment on the mirror cover adapted to stop the slidable mirror cover in a predetermined position relative to the case.

9. In a device of the character described, the combination of a main case having a slot in the bottom thereof; a mirror cover slidably associated with the case and adapted to be moved longitudinally thereof from a closed to an extended position relative thereto; guide means for maintaining said mirror in a lowered position relative to said case until it has been moved to said extended position and for then releasing the same; means carried by said mirror and projecting through said slot for sliding the mirror relative to the case; and means for maintaining said cover in association with said case after it has been moved to said extended position, said last named means having a hinged connection with said mirror cover whereby the latter may be swung to a raised position relative to said case.

10. In a device of the character described, the combination of a main case; a mirror constituting the cover for said case and slidably associated therewith, adapted to be moved longitudinally thereof from a closed position to an extended position relative thereto; guide means for maintaining said mirror in a lowered position relative to said case until it has been moved to said extended position and for then releasing the same; means for maintaining said mirror in association with said case after it has been moved to said extended position; pivot means between said mirror and said last named means whereby said mirror may be moved to a raised position relative to said case; a spring means having a normal bias to urge the mirror from said lowered to said raised position; and means for limiting movement of said mirror when it is in said raised position and for guiding said mirror from said raised position to said lowered position upon movement thereof toward said closed position.

11. In a device of the character described, the combination of a main case; a mirror cover slidably and pivotally associated with said main case, movable longitudinally thereof to an extended position projecting outwardly therefrom; guide means for maintaining said mirror cover in a lowered position relative to said case until moved to said extended position and for then releasing the same to be swung to a raised position relative to the case; and means connected to said mirror cover and extending through said case for moving said mirror cover to said extended position.

12. In a device of the character described, the combination of a main case; a mirror cover slidably and pivotally associated with said main case, movable longitudinally thereof to an extended position projecting outwardly therefrom; guide means for maintaining said mirror cover in a lowered position relative to said case until moved to said extended position and for then releasing the same to be swung to a raised position relative to the case; spring means for swinging said mirror cover to said raised position; and finger means for moving said mirror cover to said extended position.

13. In a device of the character described, the combination of a main case having a bottom wall and side walls and having a slot extending longitudinally in one of said walls; a mirror cover slidably and pivotally associated with said main case, movable longitudinally thereof from a closed position to an extended position projecting outwardly therefrom; guide means for maintaining said mirror cover in a lowered position relative to said main case until moved to said extended position and for then releasing the same to be swung to a raised position relative to said main case; and means connected to said mirror cover and extending through said slot for moving said mirror cover between the closed and extended positions.

14. In a device of the character described, the combination of a main case; guide means on said case and extending longitudinally thereof; a mirror cover having portions cooperable with said guide means for maintaining said mirror cover in a lowered position relative to said case as the same is moved longitudinally thereof from a closed position to an extended position relative thereto; and means cooperable with said guide means and movable longitudinally with said mirror cover for providing a pivotal connection between said main case and said mirror cover when the latter is in said extended position.

15. In a device of the character described, the combination of a main case; guide means on said case and extending longitudinally thereof; a mirror cover having portions cooperable with said guide means for maintaining said mirror cover in a lowered position relative to said case as the same is moved longitudinally from a closed position to an extended position relative thereto; means cooperable with said guide means and movable longitudinally with said mirror cover for providing a pivotal connection between said main case and said mirror cover when the latter is in said extended position; and means for moving said mirror cover to a raised position relative to said main case when in said extended position.

16. In a device of the character described, the combination of a main case; guide means on said case and extending longitudinally thereof; a mirror cover having portions cooperable with said guide means for maintaining said mirror cover in a lowered position relative to said case as the same is moved longitudinally from a closed position to an extended position relative thereto; means cooperable with said guide means and movable longitudinally with said mirror cover for providing a pivotal connection between said main case and said mirror cover when the latter is in said extended position; and spring means associated with said pivotal connection for moving said mirror cover to a raised position relative to said main case when in said extended position.

HYMAN R. SEGAL.